(12) United States Patent
Takahashi et al.

(10) Patent No.: US 8,286,748 B2
(45) Date of Patent: Oct. 16, 2012

(54) WORK VEHICLE

(75) Inventors: Hirotaka Takahashi, Komatsu (JP); Toru Shiina, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/392,838

(22) PCT Filed: Sep. 1, 2010

(86) PCT No.: PCT/JP2010/064877
§ 371 (c)(1),
(2), (4) Date: Feb. 27, 2012

(87) PCT Pub. No.: WO2011/027759
PCT Pub. Date: Mar. 10, 2011

(65) Prior Publication Data
US 2012/0152642 A1 Jun. 21, 2012

(30) Foreign Application Priority Data
Sep. 3, 2009 (JP) .................. 2009-204036

(51) Int. Cl.
*B60K 17/00* (2006.01)
(52) U.S. Cl. ...................... 180/307; 180/305
(58) Field of Classification Search ............ 180/65.265, 180/65.275, 65.285, 305–308
See application file for complete search history.

(56) References Cited

U.S. PATENT DOCUMENTS

| 4,801,247 | A  | * | 1/1989  | Hashimoto et al. | ............ | 417/213 |
| 5,177,964 | A  | * | 1/1993  | Tanaka et al.    | .................... | 60/445  |
| 5,941,689 | A  | * | 8/1999  | Skirde           | ............... | 417/32  |
| 6,748,739 | B1 | * | 6/2004  | Hirano et al.    | .................... | 60/431  |
| 6,966,180 | B2 | * | 11/2005 | Deneir et al.    | .................... | 60/327  |
| 7,469,534 | B2 | * | 12/2008 | Nishi et al.     | .................... | 60/428  |
| 7,613,560 | B2 | * | 11/2009 | Nishi et al.     | .................... | 701/93  |
| 7,926,267 | B2 | * | 4/2011  | Koehler et al.   | .................... | 60/492  |
| 7,967,099 | B2 | * | 6/2011  | Fausch           | .................... | 180/308 |
| 8,051,649 | B2 | * | 11/2011 | Yoshimoto et al. | .................... | 60/329  |
| 8,205,444 | B2 | * | 6/2012  | Kuras et al.     | .................... | 60/464  |
| 2004/0211614 | A1 | * | 10/2004 | Matsuyama     | .................... | 180/305 |

FOREIGN PATENT DOCUMENTS

| JP | 2004-144254 A | 5/2004 |
| JP | 2008-39013 A  | 2/2008 |
| JP | 2008-223898 A | 9/2008 |

OTHER PUBLICATIONS

International Search Report of corresponding PCT Application No. PCT/JP2010/064877.

\* cited by examiner

*Primary Examiner* — Jeffrey J Restifo
*Assistant Examiner* — Jacob Meyer
(74) *Attorney, Agent, or Firm* — Global IP Counselors

(57) ABSTRACT

In the work vehicle, a controller is configured to control a motor displacement control part via feedback control so that the driving hydraulic pressure detected by a driving hydraulic pressure detector approaches a predetermined target driving hydraulic pressure. The controller is configured to perform low temperature motor displacement limitation control, which reduces the maximum displacement of a hydraulic motor, when the temperature of the hydraulic fluid detected by the fluid temperature detector is lower than a predetermined temperature.

5 Claims, 11 Drawing Sheets

| DRIVING FLUID TEMPERATURE [°C] | T0 | T1 | T2 | T3 | T4 |
|---|---|---|---|---|---|
| P_GAIN CORRECTION AMOUNT | a1 | a1 | a2 | 0 | 0 |
| I_GAIN CORRECTION AMOUNT | b1 | b1 | b2 | 0 | 0 |
| D_GAIN CORRECTION AMOUNT | 0 | 0 | 0 | 0 | 0 |

FIG. 8

WORK VEHICLE

CROSS-REFERENCE TO RELATED APPLICATIONS

This application claims priority to Japanese Patent Application No. 2009-204036 filed on Sep. 3, 2009, the disclosure of which is hereby incorporated herein by reference in its entirety.

TECHNICAL FIELD

The present invention relates to a work vehicle.

BACKGROUND ART

In a work vehicle equipped with a so-called Hydrostatic transmission (HST) circuit, a hydraulic pump is driven by an engine, and hydraulic fluid discharged from the hydraulic pump is supplied to a hydraulic motor. A drive wheel is then driven by the hydraulic motor, propelling the vehicle forward.

As a conventional example of a work vehicle such as that described above, a work vehicle such as that described in Japanese Laid-Open Patent Application Publication No. 2004-144254 is known in which the displacement of the hydraulic motor is electronically controlled. This work vehicle has a hydraulic motor, a cylinder, and a control valve. The cylinder has a main cylinder body and a piston rod that extends and contracts with respect to the main cylinder body, and the angle of an inclined shaft of the hydraulic motor, i.e., its tilt angle, is changed through the movement of this piston rod. The piston rod is connected to the control valve. The control valve is an electromagnetic control valve that is electronically controlled by the controller. Thus, in this work vehicle, it is possible to change the displacement of the hydraulic motor as desired by controlling the cylinder through electronic control of the control valve.

SUMMARY OF THE INVENTION

As described above, when the displacement of the hydraulic motor is electronically controlled, the controller outputs a predetermined command signal to the control valve. This command signal is set via feedback control. Specifically, the actual driving hydraulic pressure driving the hydraulic motor is detected, and the command signal is set so that this actual driving hydraulic pressure approaches a predetermined target driving hydraulic pressure. For example, as illustrated in FIG. 12, the controller outputs the command signal to the control valve so that hydraulic motor displacement while the vehicle is traveling becomes a predetermined value q1 (see line Li1). Then, when the vehicle is stopped at time t1, a command signal is output to the control valve so that hydraulic motor displacement becomes a maximum value qmax (see line Li2).

Here, when the temperature of the hydraulic fluid is low, the viscosity of the hydraulic fluid is high, and the resistance of the hydraulic fluid within the hydraulic circuit becomes large. For this reason, delays in hydraulic motor response to changes in the command signal to the control valve occur. Specifically, as shown in FIG. 12, actual change in displacement (see dotted line Lr) relative to change in hydraulic motor displacement (see lines Li1 to Li3) corresponding to the command signal sent to the control valve ("command displacement") appears after a delay, and gradually increases from time t1 onward. In such circumstances, when the vehicle is operated so as to advance at time t2, then, as shown by dotted line Li3, a command signal is output so that command displacement gradually decreases, but actual displacement continues to gradually increase. For this reason, from time t2 to time t3, the deviation between the target driving hydraulic pressure and the actual driving hydraulic pressure grows large, and there is a possibility of hunting occurring. In this case, the vehicle's acceleration ability decreases.

An object of the present invention lies in providing a work vehicle in which the occurrence of hunting during hydraulic motor displacement control when hydraulic fluid temperature is low can be prevented.

A work vehicle according to a first aspect of the present invention has an engine, a hydraulic pump, a hydraulic motor, a motor displacement control part, a drive wheel, a pressure detector, a fluid temperature detector, and a controller. The hydraulic pump is driven by the engine. The hydraulic motor is a variable displacement hydraulic motor driven by hydraulic fluid discharged by the hydraulic pump. The motor displacement control part is configured to control the displacement of the hydraulic motor. The drive wheel is driven by the hydraulic motor. The pressure detector is configured to detect driving hydraulic pressure, which is the pressure of the hydraulic fluid for driving the hydraulic motor. The fluid temperature detector is configured to detect the temperature of the hydraulic fluid. The controller is configured to control the motor displacement control part via feedback control so that the driving hydraulic pressure detected by the pressure detector approaches a predetermined target driving hydraulic pressure. The controller is configured to perform low temperature motor displacement limitation control for reducing the maximum displacement of the hydraulic motor, when the temperature of the hydraulic fluid detected by the fluid temperature detector is lower than a predetermined temperature.

A work vehicle according to a second aspect of the present invention is a work vehicle according to the first aspect, wherein the controller is configured not to perform the low temperature motor displacement limitation control when the driving hydraulic pressure detected by the pressure detector is greater than a predetermined threshold.

A work vehicle according to a third aspect of the present invention is a work vehicle according to the first aspect, wherein the controller is configured to perform traction control in which the controller changes the maximum displacement of the hydraulic motor for changing the traction of the vehicle. The controller is configured to control the motor displacement control part, there being set as the maximum displacement of the hydraulic motor the smaller of the maximum displacement of the hydraulic motor determined during the traction control and the maximum displacement of the hydraulic motor determined during the low temperature motor displacement limitation control.

A work vehicle according to a fourth aspect of the present invention is a work vehicle according to any of the first through the third aspects, wherein the controller is configured to perform variable maximum speed control in which the controller changes the minimum displacement of the hydraulic motor for changing the maximum speed of the vehicle to a plurality of levels. When the lowest maximum speed is selected during the variable maximum speed control, the controller is configured not to perform the low temperature motor displacement limitation control.

A work vehicle according to a fifth aspect of the present invention is a work vehicle according to any of the first through the third aspects, wherein the controller is configured to perform variable maximum speed control in which the controller changes the minimum displacement of the hydraulic motor for changing the maximum speed of the vehicle. When the minimum displacement of the hydraulic motor determined by the variable maximum speed control is equal to or greater than the maximum displacement of the hydraulic motor determined by the low temperature motor displacement limitation control, the controller is configured not to perform the low temperature motor displacement limitation control.

In the work vehicle according to a first aspect of the present invention, when the temperature of the hydraulic fluid is lower than a predetermined temperature, the maximum displacement of the hydraulic motor decreases. For this reason, even if delays in hydraulic motor response occur, the deviation between actual driving hydraulic pressure and target driving hydraulic pressure is small. It is thereby possible to prevent hunting from occurring during hydraulic motor displacement control when hydraulic fluid temperature is low.

In the work vehicle according to a second aspect of the present invention, when the driving hydraulic pressure is greater than a predetermined threshold, reduction in maximum displacement of the hydraulic motor via low temperature motor displacement limitation control is not performed even when the temperature of the hydraulic fluid is low. When the driving hydraulic pressure is high, working requiring large amounts of traction force is often performed. In such cases, it is possible to prevent reductions in traction force by not reducing the maximum displacement of the hydraulic motor.

In the work vehicle according to a third aspect of the present invention, when low temperature motor displacement limitation control and traction control occur simultaneously, the smaller maximum displacement is set as the maximum displacement of the hydraulic motor. For this reason, when the temperature of the hydraulic fluid is low, hunting can be prevented without interference from traction control.

In the work vehicle according to a fourth aspect of the present invention, when the lowest maximum speed is selected during variable maximum speed control, reduction of maximum displacement of the hydraulic motor via low temperature motor displacement limitation control is not performed. When the lowest maximum speed is selected during variable maximum speed control, the minimum displacement of the hydraulic motor is changed to the highest value. For this reason, even if the vehicle begins advancing from a parked state as described above, the command displacement is not set to a value far removed from the maximum displacement, and the incidence of hunting such as described above is reduced.

In the work vehicle according to a fifth aspect of the present invention, it is possible to prevent the maximum displacement of the hydraulic motor from being set to a value less than the minimum displacement. When the minimum displacement of the hydraulic motor determined by variable maximum speed control is equal to or greater than the maximum displacement of the hydraulic motor determined by low temperature motor displacement limitation control, the minimum displacement of the hydraulic motor is changed to a large value. For this reason, even if the vehicle begins advancing from a parked state as described above, the command displacement of the hydraulic motor is not set to a value far removed from the maximum displacement, and hunting such as described above tends not to occur.

BRIEF DESCRIPTION OF THE DRAWINGS

FIG. 8 is a table illustrating correction amounts during PID control;

DETAILED DESCRIPTION OF THE PREFERRED EMBODIMENTS

Overall Configuration

Figure 1:
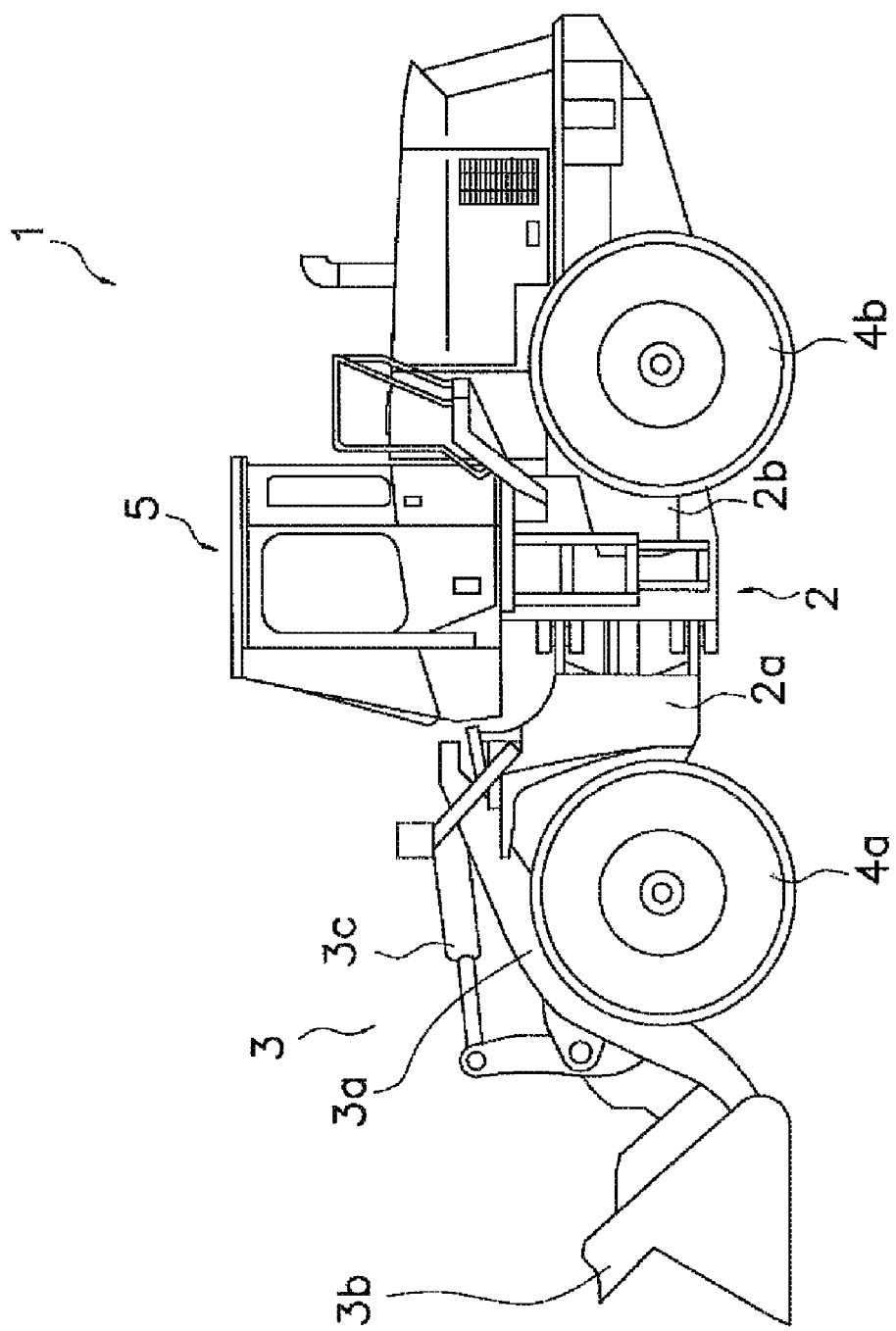
FIG. 1 is a side view of a work vehicle.

FIG. 1 is a side view of a construction vehicle 1 according to a first embodiment of the present invention. This construction vehicle 1 is a wheel loader that is capable of self-propulsion by tires 4*a* and 4*b* and can perform a desired type of work using a work machine 3. The construction vehicle 1 is provided with a body frame 2, a work machine 3, tires 4*a* and 4*b*, and an operator cab 5.

The body frame 2 has a front frame 2*a* frontwardly disposed and a rear frame 2*b* rearwardly disposed, and the front frame 2*a* and rear frame 2*b* are connected with a central part of the body frame 2 so as to be capable of swinging in the lateral direction.

Figure 2:
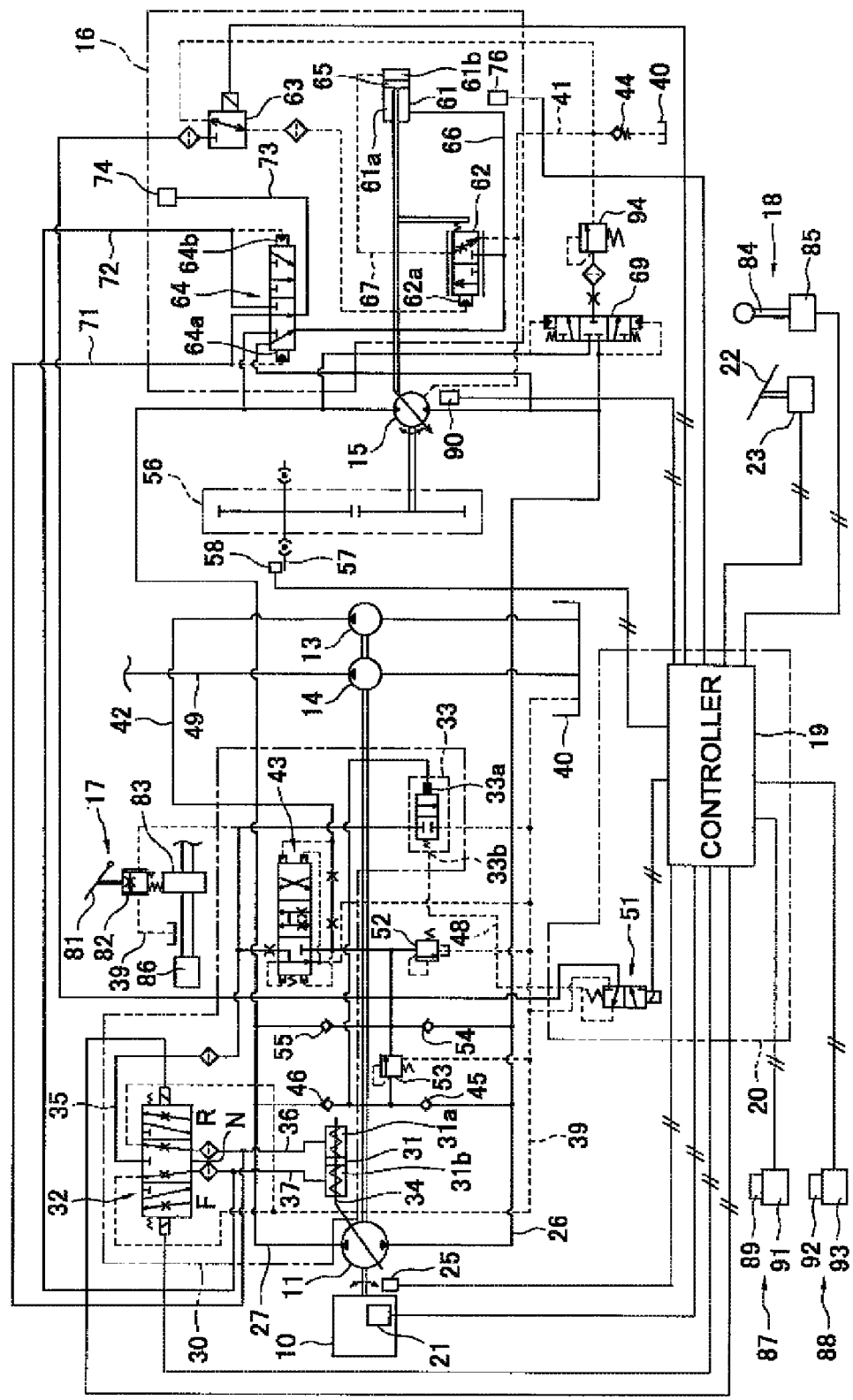
FIG. 2 is an illustration of the configuration of a hydraulic drive mechanism of a work vehicle.

The work machine 3 and a pair of front tires 4*a* are attached to the front frame 2*a*. The work machine 3 is an apparatus driven by hydraulic fluid pumped by a second hydraulic pump 14 (see FIG. 2), and has a lift arm 3*a* mounted to a front part of the front frame 2*a*, a basket 3*b* attached to an end of the lift arm 3*a*, a lift cylinder (not illustrated) that drives the lift arm 3*a*, and a tilt cylinder 3*c* that drives the basket 3*b*. The pair of front tires 4*a* is provided on side surfaces of the front frame 2*a*.

The operator cab 5 and a pair of rear tires 4*b* is provided on the rear frame 2*b*. The operator cab 5 is mounted on an upper part of the body frame 2, and is furnished in its interior with operating parts such as a steering wheel, an accelerator pedal, and the like; a display part that displays various types of information such as vehicle speed; a seat; and the like. The pair of rear tires 4*b* is provided on side surfaces of the rear frame 2*b*.

Also mounted on the body frame 2 are tires 4*a* and 4*b* as drive wheels, and a hydraulic drive mechanism for driving the work machine 3. The structure of the hydraulic drive mechanism will be explained below with reference to FIG. 2.

Hydraulic Drive Mechanism

The hydraulic drive mechanism primarily has an engine 10, a first hydraulic pump 11 for traveling, a pump displacement control part 30, a charge pump 13, a second hydraulic pump 14 for a work machine, a hydraulic motor 15 for traveling, a motor displacement control part 16, an inching operation part 17, a forward/backward switching operation part 18, a controller 19, and the like. In the hydraulic drive mechanism, a closed HST circuit is formed by the first hydraulic pump 11 and the hydraulic motor 15.

The engine 10 is a diesel engine, and output torque generated by the engine 10 is conveyed to the first hydraulic pump 11, the charge pump 13, and the second hydraulic pump 14. A fuel injector device 21 that controls the output torque and the rotation rate of the engine 10 is attached to the engine 10. The fuel injector device 21 adjusts a rotation rate command value of the engine 10 according to the amount by which an accelerator pedal 22 is operated (hereafter "accelerator operation amount"), adjusting the amount of fuel injected. The accelerator pedal 22 constitutes means for indicating the target rotation rate for the engine 10, and is provided with an accelerator operation amount detector 23. The accelerator operation amount detector 23 is a potentiometer or the like, and detects the accelerator operation amount. The accelerator operation amount detector 23 sends an opening angle signal indicating accelerator operation amount to the controller 19, and a command signal is outputted from the controller 19 to the fuel injector device 21. The operator is thereby able to control the rotation rate of the engine 10 by adjusting the amount by which the accelerator pedal 22 is operated. The engine 10 is also provided with an engine-rotation-rate detector 25 which is composed of a rotational sensor that detects the actual rotation rate of the engine 10. A detection signal indicating the rate of engine rotation is input from the engine-rotation-rate detector 25 to the controller 19.

The first hydraulic pump 11 is a variable displacement hydraulic pump whose displacement can be altered by modifying the angle of a swashplate, and is driven by the engine 10. Hydraulic fluid pumped out of the first hydraulic pump 11 is sent to the hydraulic motor 15 via drive circuits 26 and 27. The drive circuit 26 is a conduit (hereafter, "forward drive circuit 26") that supplies hydraulic fluid to the hydraulic motor 15 so as to drive the hydraulic motor 15 in a direction such that the vehicle will advance. The drive circuit 27 is a conduit (hereafter, "backward drive circuit 27") that supplies hydraulic fluid to the hydraulic motor 15 so as to drive the hydraulic motor 15 in a direction such that the vehicle will move in reverse.

The pump displacement control part 30 controls the displacement of the first hydraulic pump 11 by changing the tilt angle of the swashplate of the first hydraulic pump 11. The pump displacement control part 30 has a pump displacement control cylinder 31, an electromagnetic direction control valve 32, and a cut-off valve 33.

The pump displacement control cylinder 31 actuates a piston 34 according to the pressure supplied by the hydraulic fluid. The pump displacement control cylinder 31 has a first fluid sump 31a and a second fluid sump 31b, and the position of the piston 34 is modified according to the balance between the hydraulic pressure within the first fluid sump 31a and the hydraulic pressure within the second fluid sump 31b. The piston 34 is connected to the swashplate of the first hydraulic pump 11, and the tilt angle of the swashplate is modified by the movement of the piston 34.

The electromagnetic direction control valve 32 is an electromagnetic control valve that controls the pump displacement control cylinder 31 based on a command signal from the controller 19. The electromagnetic direction control valve 32 is capable of controlling the direction in which hydraulic fluid is supplied to the pump displacement control cylinder 31 based on a command signal from the controller 19. Thus, by electronically controlling the electromagnetic direction control valve 32, the controller 19 can alter the direction in which hydraulic fluid is pumped out of the first hydraulic pump 11. The electromagnetic direction control valve 32 switches between a forward drive mode F, a backward drive mode R, and a neutral mode N.

When in forward drive mode F, the electromagnetic direction control valve 32 connects a first pilot circuit 36 and a main pilot circuit 35 described below, and connects a second pilot circuit 37 and a drainage circuit 39. The drainage circuit 39 is connected to a tank 40. The first pilot circuit 36 is connected to the first fluid sump 31a of the pump displacement control cylinder 31. The second pilot circuit 37 is connected to the second fluid sump 31b of the pump displacement control cylinder 31. Because of this, when the electromagnetic direction control valve 32 is in forward drive mode F, hydraulic fluid is supplied to the first fluid sump 31a via the main pilot circuit 35 and the first pilot circuit 36, and hydraulic fluid is discharged from the second fluid sump 31b. Through this, the tilt angle of the first hydraulic pump 11 is changed to a direction such that displacement towards the forward drive circuit 26 increases.

When in backward drive mode R, the electromagnetic direction control valve 32 connects the second pilot circuit 37 and the main pilot circuit 35, and connects the first pilot circuit 36 and the drainage circuit 39. Because of this, when the electromagnetic direction control valve 32 is in backward drive mode R, hydraulic fluid is supplied to the second fluid sump 31b via the main pilot circuit 35 and the second pilot circuit 37. Through this, the tilt angle of the first hydraulic pump 11 is changed to a direction such that displacement towards the backward drive circuit 27 increases. When the electromagnetic direction control valve 32 is in neutral mode N, both the first pilot circuit 36 and the second pilot circuit 37 are connected to the drainage circuit 39.

The charge pump 13 is driven by the engine 10, and is a fixed displacement pump that discharges hydraulic fluid. The hydraulic fluid discharged by the charge pump 13 is supplied to the electromagnetic direction control valve 32 via a charge circuit 42, an engine sensing valve 43, and the main pilot circuit 35. The charge pump 13 supplies hydraulic fluid to the electromagnetic direction control valve 32 in order to actuate the pump displacement control cylinder 31. The engine sensing valve 43 converts hydraulic pressure from the charge pump 13 into hydraulic pressure according to the engine rotation rate. Thus, the engine sensing valve 43 changes the pressure of the main pilot circuit 35 according to the engine rotation rate. Specifically, when the engine rotation rate increases, the engine sensing valve 43 increases the pressure of the main pilot circuit 35. Alterations in the pressure of the main pilot circuit 35 by the engine sensing valve 43 increase and decrease the displacement of the first hydraulic pump 11 described above.

The cut-off valve 33 is connected to main pilot circuit 35. A first pilot port 33a of the cut-off valve 33 is connected to a forward drive circuit 26 via a check valve 45, and to a backward drive circuit 27 via a check valve 46. A second pilot port 33b of the cut-off valve 33 is connected to the charge circuit 42 via a cut-off pilot circuit 48 and a cut-off pressure control valve 51 described below. The cut-off valve 33 is switched between an open state and a closed state according to the hydraulic pressure of drive circuits 26 and 27 (hereafter, "driving hydraulic pressure"). The cut-off valve 33 thereby limits driving hydraulic pressure so as not to surpass a set cut-off pressure value. Specifically, when driving hydraulic pressure reaches or surpasses a set cut-off pressure value, the cut-off valve 33 connects the main pilot circuit 35 and the drainage circuit 39, and reduces the pressure of the main pilot circuit 35 (hereafter, the main pilot circuit pressure). When the main pilot circuit pressure is reduced, the pilot pressure being supplied to the pump displacement control cylinder 31 via the electromagnetic direction control valve 32 is reduced. As a result, the displacement of the first hydraulic pump 11 is reduced, and driving hydraulic pressure is reduced. The pump displacement control part 30 thereby controls the displacement of the first hydraulic pump 11 so that the driving hydraulic pressure does not surpass a predetermined cut-off pressure value. The cut-off valve 33 is also capable of changing the cut-off pressure according to the pilot pressure supplied to the second pilot port 33b.

The cut-off pressure control valve 51 is an electromagnetic control valve electronically controlled by a command signal from the controller 19, and is switched between two levels, an excited state and an unexcited state. When in an excited state, the cut-off pressure control valve 51 connects the cut-off pilot circuit 48 and the drainage circuit 39. Hydraulic fluid is thereby expelled from the second pilot port 33b of the cut-off valve 33, and the cut-off pressure of the cut-off valve 33 is set at a predetermined low pressure value. When in an unexcited state, the cut-off pressure control valve 51 connects the charge circuit 42 and the cut-off pilot circuit 48. Hydraulic fluid is thereby supplied to the second pilot port 33b of the cut-off valve 33, and the cut-off pressure of the cut-off valve 33 is set at a predetermined high pressure value. In this way, the cut-off pressure control valve 51 is capable of controlling the pilot pressure supplied to the second pilot port 33b of the cut-off valve 33 according to a command signal input from the controller 19.

The charge circuit 42 is also connected to the drainage circuit 39 via a first relief valve 52. The first relief valve 52 limits the hydraulic pressure of the charge circuit 42 so that it does not surpass a predetermined relief pressure. The charge circuit 42 is connected to drive circuits 26 and 27 via a second relief valve 53 and check valves 54 and 55. The second relief valve 53 connects the charge circuit 42 and the drive circuits 26 and 27 when the driving hydraulic pressure reaches a predetermined relief pressure. The drive circuits 26 and 27 are thereby limited so as not to surpass a predetermined relief pressure.

The second hydraulic pump 14 is driven by the engine 10. Hydraulic fluid discharged from the second hydraulic pump 14 is sent to a tilt cylinder 3c via a work machine circuit 49 (see FIG. 1), driving the tilt cylinder 3c and other components.

The hydraulic motor 15 is a variable displacement hydraulic motor 15 capable of changing displacement by modifying the tilt angle of an inclined shaft. The hydraulic motor 15 is driven by hydraulic fluid that is discharged from the first hydraulic pump 11 and supplied via the drive circuits 26 and 27. The hydraulic motor 15 thereby generates the driving force needed for driving. By being supplied with hydraulic fluid via the forward drive circuit 26, the hydraulic motor 15 drives the vehicle in a forward direction. By being supplied with hydraulic fluid via the backward drive circuit 27, the hydraulic motor 15 drives the vehicle in a backward direction. The hydraulic motor 15 is also connected to a drainage circuit 41 described below, and is provided with a fluid temperature detector 90 which is composed of a temperature sensor for detecting the temperature of the hydraulic fluid discharged from the hydraulic motor 15. Specifically, the fluid temperature detector 90 detects the temperature of the hydraulic fluid being supplied to the hydraulic motor 15 (hereafter, "driving fluid temperature").

The driving force of the hydraulic motor 15 is conveyed to an output shaft 57 via a transfer 56, whereby the tires 4a and 4b rotate and the vehicle is propelled. The output shaft 57 is also provided with an output rotation rate detector 58 which is composed of a rotational sensor that detects the rotation rate and rotational direction of the output shaft 57. The information detected by the output rotation rate detector 58 is sent to the controller 19 as a detection signal. Based on the rotation rate of the output shaft 57 detected by the output rotation rate detector 58, the controller 19 is able to determine whether the vehicle is moving forward or backward, or if it is parked. As such, the output rotation rate detector 58 functions as a forward/backward detector that detects whether the vehicle is moving forward or backward.

The motor displacement control part 16 controls the displacement of the hydraulic motor 15 (hereafter simply "motor displacement") by controlling the angle of incline of an inclined shaft of the hydraulic motor 15. The motor displacement control part 16 has a motor displacement control cylinder 61, a motor displacement control valve 62, a pilot pressure control valve 63, and a forward/backward switching valve 64.

The motor displacement control cylinder 61 actuates a piston 65 according to the pressure of the supplied hydraulic fluid. The motor displacement control cylinder 61 has a first fluid sump 61a and a second fluid sump 61b, and the position of the piston 65 is modified according to the balance between the hydraulic pressure within the first fluid sump 61a and the hydraulic pressure within the second fluid sump 61b. The piston 65 is connected to the inclined shaft of the hydraulic motor 15, and the angle of the inclined shaft is modified by the movement of the piston 65.

The motor displacement control valve 62 controls the motor displacement control cylinder 61 according to the pilot pressure being supplied. The motor displacement control valve 62 is switched between a first state and a second state according to the pilot pressure being supplied to pilot port 62a. In the first state, the motor displacement control valve 62 connects a first motor cylinder circuit 66 and a second motor cylinder circuit 67. The first motor cylinder circuit 66 is a circuit connecting the forward/backward switching valve 64 and the first fluid sump 61a of the motor displacement control cylinder 61. The second motor cylinder circuit 67 is a circuit connecting the motor displacement control valve 62 and the second fluid sump 61b of the motor displacement control cylinder 61. When the motor displacement control valve 62 is in the first state, hydraulic fluid is supplied to the second fluid sump 61b of the motor displacement control cylinder 61. The piston 65 of the motor displacement control cylinder 61 is thereby actuated so that motor displacement decreases. When the motor displacement control valve 62 is in the second state, the motor displacement control valve 62 connects the second motor cylinder circuit 67 and a drainage circuit 41. The drainage circuit 41 is connected to the tank 40 via a check valve 44. For this reason, hydraulic fluid is discharged from the second fluid sump 61b of the motor displacement control cylinder 61. The piston 65 of the motor displacement control cylinder 61 is thereby actuated so that motor displacement increases. As described above, the motor displacement control valve 62 controls the direction and amount of hydraulic fluid supplied to motor displacement control cylinder 61 according to the pilot pressure supplied to the pilot port 62a. The motor displacement control valve 62 is thereby capable of controlling motor displacement based on pilot pressure.

The pilot pressure control valve 63 controls the supply and discharge of hydraulic fluid to and from the pilot port 62a of the motor displacement control valve 62. The pilot pressure control valve 63 supplies hydraulic fluid from the charge circuit 42 to the pilot port 62a. The pilot pressure control valve 63 also discharges hydraulic fluid from the pilot port 62a to the tank 40. The pilot pressure control valve 63 is capable of controlling hydraulic pressure being supplied to the pilot port 62a of the motor displacement control valve 62 as desired according to a command signal from the controller 19. Thus, by electrically controlling the pilot pressure control valve 63, the controller 19 can control the hydraulic fluid displacement of the hydraulic motor 15 as desired. A low pressure switch valve 69 connects whichever of drive circuits 26 and 27 has lower pressure to the tank 40 via a relief valve 94.

The forward/backward switching valve 64 supplies hydraulic fluid from whichever of drive circuits 26 and 27 has higher pressure to the motor displacement control cylinder 61. Specifically, when the electromagnetic direction control valve 32 is in forward drive mode F, hydraulic fluid is supplied to a forward drive pilot port 64a of the forward/backward switching valve 64 via a forward drive pilot circuit 71 connected to the first pilot circuit 36. The forward/backward switching valve 64 is thereby shifted into forward drive mode F. When in forward drive mode F, the forward/backward switching valve 64 connects the forward drive circuit 26 and the first motor cylinder circuit 66, and connects the forward drive pilot circuit 71 to a pressure detection circuit 73. Hydraulic fluid from the forward drive circuit 26 is thereby supplied to the motor displacement control cylinder 61. The pressure detection circuit 73 is also connected to a pilot circuit pressure detector 74 comprising a hydraulic pressure sensor. Thus, the pressure of the forward drive pilot circuit 71 is detected by the pilot circuit pressure detector 74. When the electromagnetic direction control valve 32 is in backward drive mode R, hydraulic fluid is supplied to a backward drive pilot port 64b of the forward/backward switching valve 64 via a backward drive pilot circuit 72 connected to the second pilot circuit 37. The forward/backward switching valve 64 is thereby shifted into backward drive mode R. When in backward drive mode R, the forward/backward switching valve 64 connects the backward drive circuit 27 and the first motor cylinder circuit 66, and connects the backward drive pilot circuit 72 to the pressure detection circuit 73. Through this, hydraulic fluid from the backward drive circuit 27 is supplied to the motor displacement control cylinder 61. The pressure of the backward drive pilot circuit 72 is detected by the pilot circuit pressure detector 74. The pilot circuit pressure detector 74 detects the hydraulic pressure of the forward drive pilot circuit 71 or of the backward drive pilot circuit 72, i.e., the main pilot circuit pressure, and sends it as a detection signal to the controller 19.

The pressure of the first motor cylinder circuit 66, i.e., the driving hydraulic pressure of the higher-pressured drive circuit driving the hydraulic motor 15, is detected by a driving hydraulic pressure detector 76. The driving hydraulic pressure detector 76 sends the driving hydraulic pressure to the controller 19 as a detection signal.

The inching operation part 17 has an inching pedal 81 and an inching valve 82. The inching pedal 81 is provided within the operator cab 5, and is operated by the operator. When the inching pedal 81 is operated, the inching valve 82 connects the main pilot circuit 35 and the drainage circuit 39. The inching valve 82 thereby reduces the main pilot circuit pressure according to the amount by which the inching pedal 81 is operated. The inching operation part 17 is used, for example, when one wishes to increase the rotation rate of the engine 10 but prevent an increase in driving speed. Specifically, when the rotation rate of the engine 10 is increased by depressing the accelerator pedal 22, the main pilot circuit pressure also increases. Here, by operating the inching pedal 81 and opening the inching valve 82, it is possible to control increase in main pilot circuit pressure. It is thereby possible to prevent an increase in the displacement of the first hydraulic pump 11, and in the rotational speed of the hydraulic motor 15.

The inching valve 82 is connected to a brake valve 83 via a spring. The brake valve 83 controls the supply of hydraulic fluid to a hydraulic brake device 86. The inching pedal 81 doubles as a member for operating the hydraulic brake device 86. Until the amount by which the inching pedal 81 is operated reaches a predetermined level, only the inching valve 82 is operated. When the operation amount of the inching pedal 81 reaches a predetermined level, operation of the brake valve 83 commences, and, braking force is thereby generated in the hydraulic brake device 86. When the inching pedal 81 is operated at or above a predetermined level, the braking force of the hydraulic brake device 86 is controlled according to the operation amount of the inching pedal 81.

The forward/backward switching operation part 18 has a forward/backward switch lever 84 as a forward/backward drive switching member and a lever operation detector 85. The forward/backward switch lever 84 is provided within the operator cab 5, and is operated by the operator so as to indicate a switch between forward and backward drive in the vehicle. The forward/backward switch lever 84 is switched between a forward motion position, a backward motion position, and a neutral position. The lever operation detector 85 detects whether the forward/backward switch lever 84 is in forward motion position, backward motion position, or neutral position, and sends the results to the controller 19 as a detection signal.

Within the operator cab 5, there are also provided a traction control operating part 87 and a variable maximum speed control operating part 88. The traction control operating part 87 has, for example, a dial-type traction selecting member 89 and a first position detector 91 for detecting the position selected using the traction selecting member 89. The first position detector 91 sends the detected selected position to the controller 19 as a detection signal. The traction selecting member 89 is operated in order to set a maximum traction force for traction control described below. The variable maximum speed control operating part 88 has, for example, a dial-type speed level selecting member 92 and a second position detector 93. The speed level selecting member 92 is operated so as to set maximum speed via variable maximum speed control as described below. The second position detector 93 detects the position selected using the speed level selecting member 92. The second position detector 93 sends the detected selected position to the controller 19 as a detection signal.

Figure 3:
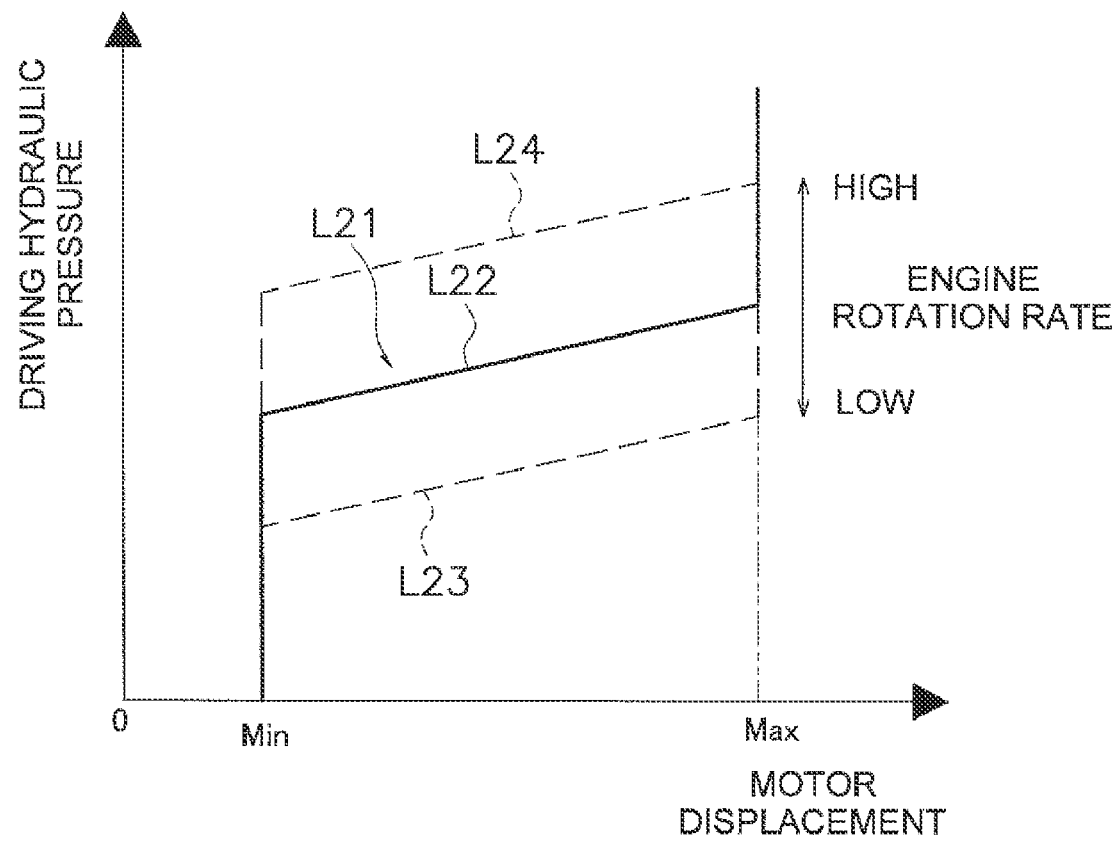
FIG. 3 is an illustration of an example of a motor displacement/driving hydraulic pressure profile.
Figure 5:
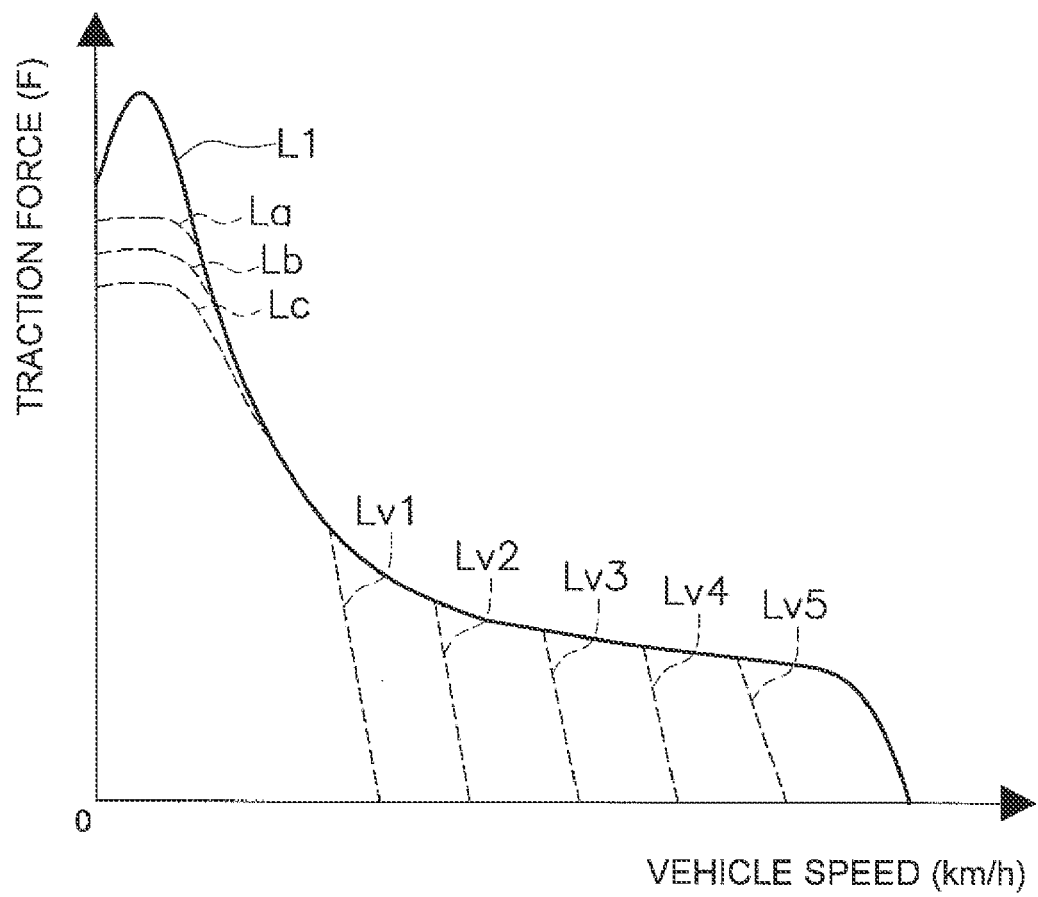
FIG. 5 is an illustration of a vehicle speed/traction force profile during traction control and variable maximum speed control.

The controller 19 is an electronic controller that has a CPU, various types of memory, and other components; and electrically controls the various electromagnetic control valves and the fuel injector device 21 based on output signals from the detectors. The controller 19 thereby controls engine rotation rate, motor displacement, and other parameters. For example, the controller 19 processes detection signals from the engine rotation rate detector 25 and the driving hydraulic pressure detector 76, and outputs a motor displacement command signal to the pilot pressure control valve 63. Here, the controller 19 sets a command signal based on the engine rotation rate and driving hydraulic pressure values through load control as described below so as to obtain a motor displacement/ driving hydraulic pressure profile such as that illustrated in FIG. 3, and outputs the signal to the pilot pressure control valve 63. Solid line L21 within FIG. 3 indicates motor displacement relative to driving hydraulic pressure for a predetermined engine rotation rate value. Up until a predetermined value, driving hydraulic pressure is at a minimum (Min), and afterwards motor displacement gradually increases along with an increase in the driving hydraulic pressure (diagonal portion L22 of the solid line). When motor displacement reaches a maximum (Max), motor displacement remains at maximum displacement Max even if pressure climbs further. The diagonal portion L22 of the solid line is set so as to go higher or lower according to engine rotation rate. Specifically, the line is controlled so that if engine rotation rate is low, motor displacement begins increasing at a lower driving hydraulic pressure, and maximum motor displacement is reached at a lower driving hydraulic pressure (see lower dotted diagonal portion L23 in FIG. 3). Conversely, if engine rotation rate is high, minimum motor displacement Min is maintained until a higher driving hydraulic pressure, and maximum motor displacement is reached at a higher driving hydraulic pressure (see upper dotted diagonal portion L24 in FIG. 3). The traction and vehicle speed of the construction vehicle 1 thereby change along a continuous range, and it is possible to automatically change speed from a vehicle speed of zero up to maximum vehicle speed without making a speed change operation (see line L1 in FIG. 5).

For instance, when forward drive is selected using the forward/reverse switching lever 84, hydraulic fluid discharged from the charge pump 13 is supplied to the first pilot circuit 36 via the charge circuit 42, engine sensing valve 43, main pilot circuit 35, and electromagnetic direction control valve 32. The piston 34 of the pump displacement control cylinder 31 is moved by the hydraulic fluid from the first pilot circuit 36 in the leftward direction in FIG. 2, and changes the angle of the swashplate of the first hydraulic pump 11. Here, the tilt angle of the swashplate of the first hydraulic pump 11 is changed in a direction such that displacement towards the forward drive circuit 26 increases. In this state, the second pilot circuit 37 is connected to the drainage circuit 39 by the electromagnetic direction control valve 32.

The hydraulic fluid from first pilot circuit 36 is supplied to the forward drive pilot port 64a of the forward/reverse switching valve 64 via the forward drive pilot circuit 71. The forward/reverse switching valve 64 is thereby shifted into forward drive state F. In this state, the forward drive circuit 26 and the first motor cylinder circuit 66 are connected, and hydraulic fluid from the forward drive circuit 26 is supplied to the motor displacement control cylinder 61. The pressure level of the forward drive circuit 26 is detected by the driving hydraulic pressure detector 76 and sent as a detection signal to the controller 19. When the forward/reverse switching valve 64 is in the forward drive state F, the forward drive pilot circuit 71 and the pressure detection circuit 73 are connected, and the pressure level of the forward drive pilot circuit 71 is detected by the pilot circuit hydraulic pressure detector 74. The pilot circuit hydraulic pressure detector 74 sends the detected pressure level of the forward drive pilot circuit 71 to the controller 19 as a detection signal. As described above, the controller 19 calculates the current value of a command signal based on the engine rotation rate and the driving hydraulic pressure, i.e., the hydraulic pressure within the forward drive circuit 26 (see FIG. 7). The controller 19 then sends a command signal having the calculated current value to the pilot pressure control valve 63. The pilot pressure control valve 63 controls the pressure of the hydraulic fluid supplied to the pilot port 62a of the motor displacement control valve 62 based on the command signal from the controller 19. The motor displacement control valve 62 is thereby controlled, and the position of the piston 65 of the motor displacement control cylinder 61 is adjusted. As a result, the angle of the inclined shaft is adjusted so that the actual motor displacement becomes a commanded displacement corresponding to the command signal.

Traction Control and Variable Maximum Speed Control

Figure 4:
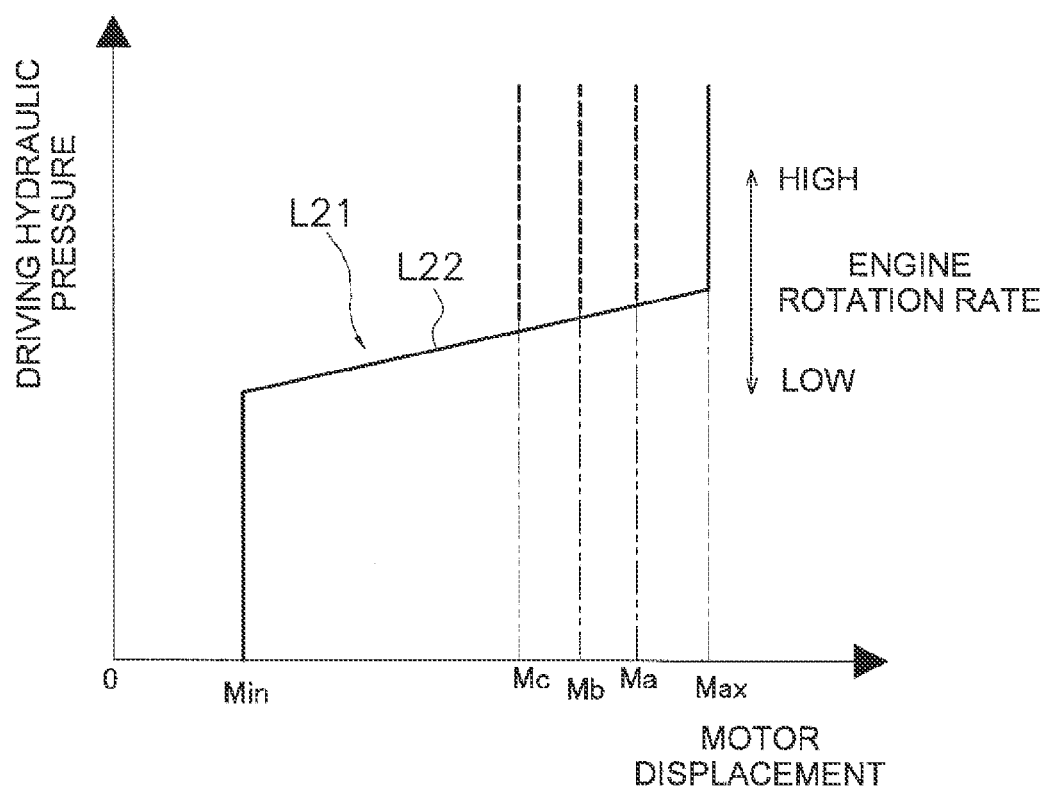
FIG. 4 is an illustration of one example of a motor displacement/driving hydraulic pressure profile during traction control.

The controller 19 performs traction control through the traction selecting member 89 being operated. Traction control refers to changing the maximum traction force of the vehicle amongst a plurality of levels by changing the maximum displacement of the hydraulic motor 15. The controller 19 reduces the maximum displacement of the hydraulic motor 15 in a plurality of levels according to the operation of the traction selecting member 89. Specifically, the controller 19 outputs a command signal to the pilot pressure control valve 63 so that maximum displacement is changed from Max to one of Ma, Mb, or Mc, as illustrated in FIG. 4. When the maximum displacement is changed to Ma, the vehicle speed/traction force profile changes as shown by line La in FIG. 5. Maximum traction force is thus reduced compared to line L1, which shows the vehicle speed/traction force profile when traction control is not being performed. When the maximum displacement is changed to Mb, the vehicle speed/traction force profile changes as shown by line Lb, and the maximum traction force decreases further. When the maximum displacement is changed to Mc, the vehicle speed/traction force profile changes as shown by line Lc, and the maximum traction force decreases even further.

Figure 6:
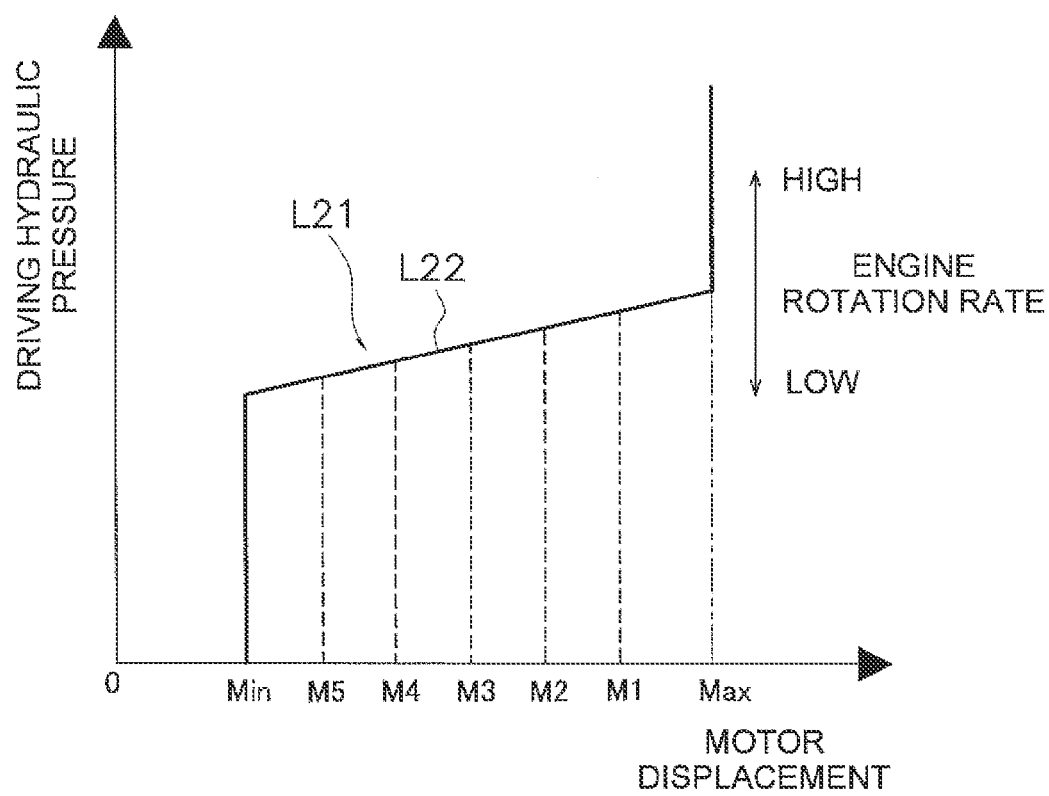
FIG. 6 is an illustration of one example of a motor displacement/driving hydraulic pressure profile during variable maximum speed control.

The controller 19 also performs variable maximum speed control through the operation of the speed level selecting member 92. In variable maximum speed control, the maximum speed of the vehicle is changed among a plurality of levels by changing the minimum displacement of the hydraulic motor 15. The controller 19 increases the minimum displacement of the hydraulic motor 15 over a plurality of levels in response to the operation of the speed level selecting member 92. For example, as illustrated in FIG. 6, when the speed level selecting member 92 is capable of selecting from five levels from the first speed to the fifth speed, the minimum displacement is changed among five levels from M1 to M5. M1 is the minimum displacement set when the first speed is selected. When the minimum displacement is set to M1, the vehicle speed/traction force profile changes as shown by line Lv1 in FIG. 5. In this way, maximum speed is reduced compared to line L1, which shows the vehicle speed/traction force profile when variable maximum speed control is not being performed. M2 is the minimum displacement set when the second speed is selected. When the minimum displacement is set to M2, the vehicle speed/traction force profile changes as shown by line Lv2 in FIG. 5. M3 is the minimum displacement set when the third speed is selected. When the minimum displacement is set to M3, the vehicle speed/traction force profile changes as shown by line Lv3 in FIG. 5. M4 is the minimum displacement set when forth speed is selected. When the minimum displacement is set to M4, the vehicle speed/traction force profile changes as shown by line Lv4 in FIG. 5. M5 is the minimum displacement set when fifth speed is selected. When the minimum displacement is set to M5, the vehicle speed/traction force profile changes as shown by line Lv5 in FIG. 5. In this way, maximum speed increases in order from speed 1 to speed 5, and reaches maximum when variable maximum speed control is not being performed.

Load Control

There shall now be described a process of load control performed by the controller 19 in order to set the command signal described above. Load control refers to feedback control of the motor displacement control part 16 so that the driving hydraulic pressure detected by the driving hydraulic pressure detector 76 approaches a predetermined target driving hydraulic pressure.

Figure 7:
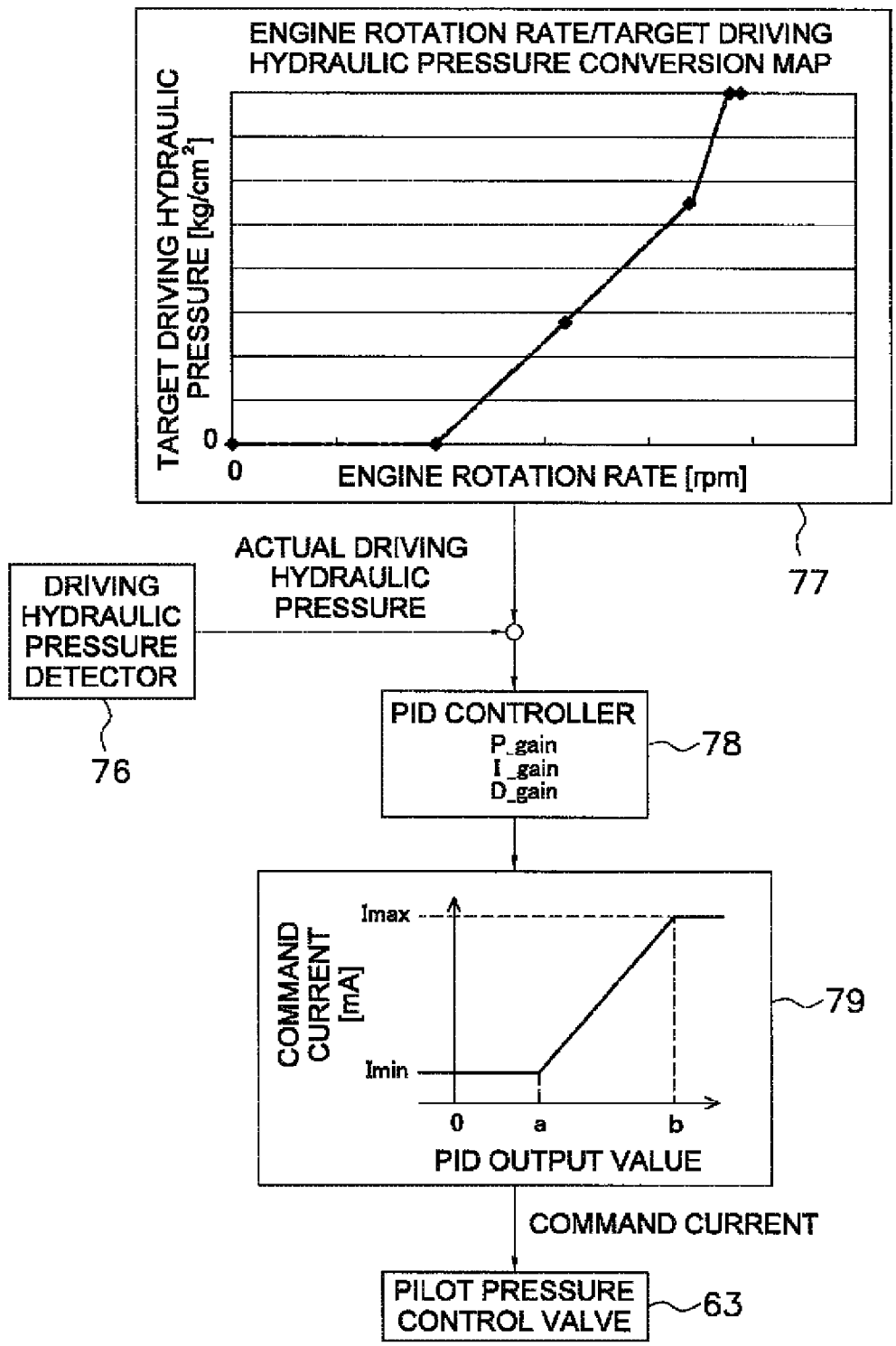
FIG. 7 is a function block chart of load control performed by the controller.

As illustrated in FIG. 7, the controller 19 has a target driving hydraulic pressure calculating part 77, a PID controller 78, and a command current calculating part 79. The target driving hydraulic pressure calculating part 77 calculates a target driving hydraulic pressure based on the engine rotation rate detected by the engine rotation rate detector 25. Specifically, the target driving hydraulic pressure calculating part 77 stores an engine rotation rate/target driving hydraulic pressure conversion map like that illustrated in FIG. 7, and calculates target driving hydraulic pressure from this conversion map.

The PID controller 78 performs PID control using as an output value the command current input into the pilot pressure control valve 63 with the target driving hydraulic pressure calculated by the target driving hydraulic pressure calculating part 77 and the actual driving hydraulic pressure detected by the driving hydraulic pressure detector 76 as input values. The PID controller 78 calculates the output value based on the formula below.

(output value)=(−1)×((P_gain×deviation)+(I_gain× cumulative deviation)+(D_gain×(current deviation−previous deviation))

Here, the PID controller 78 uses predetermined constants for three gains P, I, and D (P_gain, I_gain, D_gain); when the driving fluid temperature detected by the fluid temperature detector 90 is low, these gains are corrected by subtracting predetermined correction amounts. For example, as illustrated in FIG. 8, when driving fluid temperature is T0 or T1, a1 is used as the correction amount for P_gain, and b1 as the correction amount for I_gain. When the driving fluid temperature is T2, a value a2 that is smaller than a1 is used as the correction amount for P_gain, and a value b2 that is smaller than b1 as the correction amount for I_gain. When the driving fluid temperature is T3 or greater, the correction amount is zero. In other words, gains are not corrected. D_gain is not corrected regardless of driving fluid temperature. Correction amounts for temperatures other than those shown in FIG. 8 are obtained by proportional calculation.

As illustrated in FIG. 7, the command current calculating part 79 limits the output value from the PID controller 78 to a range between a predetermined maximum value Imax and minimum value Imin. When traction control is performed, the minimum value Imin is set to a value corresponding to a maximum displacement set by traction control. When variable maximum speed control is executed, the maximum value Imax is set to a value corresponding to the minimum displacement set by variable maximum speed control. A lower command current corresponds to a higher motor displacement. A command signal having the command current calculated by the command current calculating part 79 is then input to the pilot pressure control valve 63. The motor displacement control part 16 is thereby controlled so that the driving hydraulic pressure detected by the driving hydraulic pressure detector 76 approaches a predetermined target driving hydraulic pressure.

Low Temperature Motor Displacement Limitation Control

Figure 9:
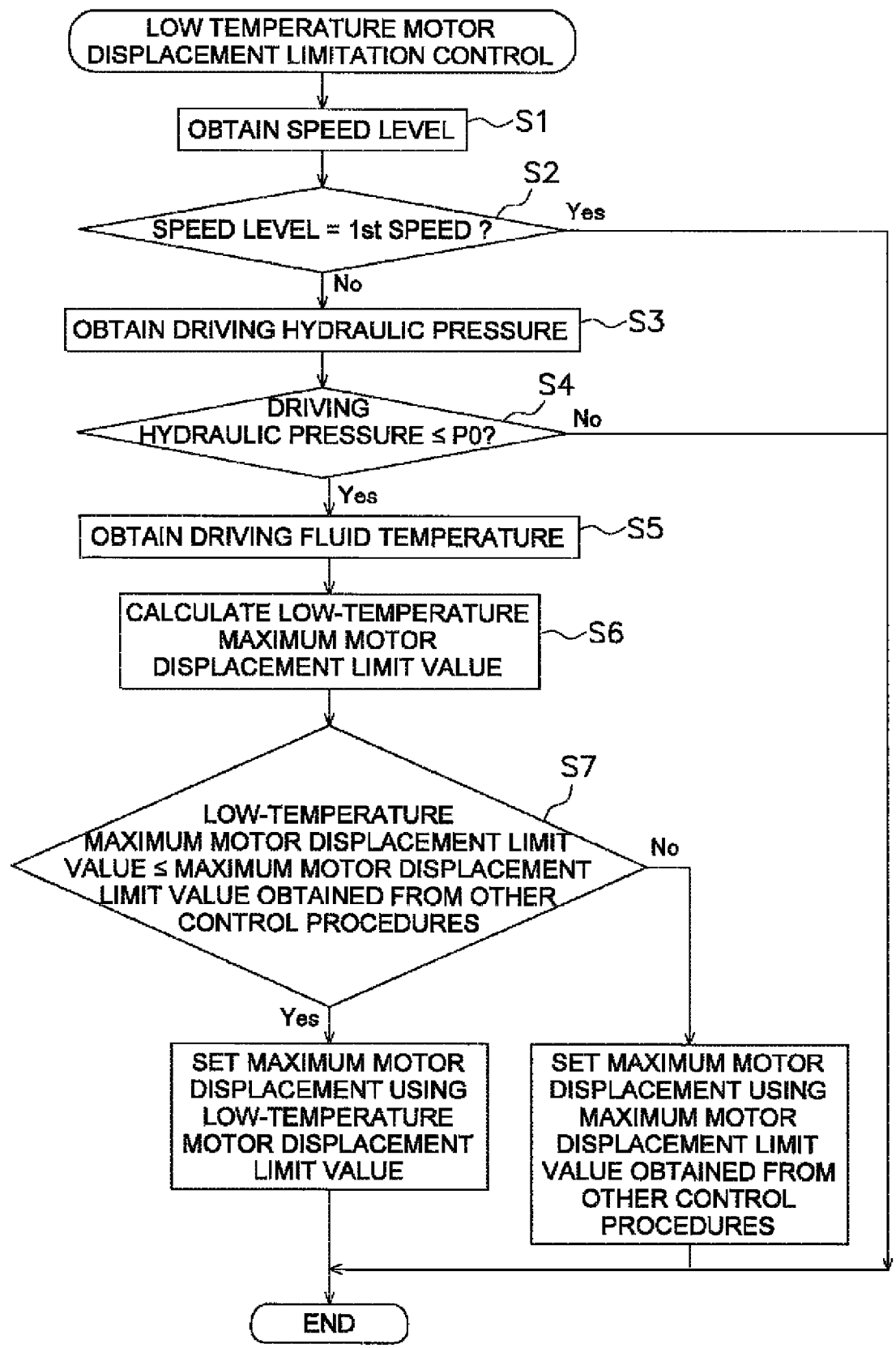
FIG. 9 is a flowchart illustrating low temperature motor displacement limitation control.

There shall now be provided a description of the process of low temperature motor displacement limitation control performed by the controller 19 with reference to the flowchart of FIG. 9. In low temperature motor displacement limitation control, the maximum displacement of the hydraulic motor 15 is reduced when the driving fluid temperature detected by the fluid temperature detector 90 is lower than a predetermined temperature.

First, in step S1, the speed level is obtained. Here, the speed level selected by the speed level selecting member 92 is obtained based on the detection signal from the second position detector 93.

In step S2, it is determined whether or not the speed level obtained in step 1 is the first speed. If the speed level is not the first speed, the procedure continues to step S3.

In step S3, driving hydraulic pressure is obtained. Here, driving hydraulic pressure is obtained based on the detection signal from the driving hydraulic pressure detector 76.

In step S4, it is determined whether or not driving hydraulic pressure is equal to or below a predetermined threshold P0. The threshold P0 is the minimum value for driving hydraulic pressure when a difference in maximum traction force occurs depending on whether or not low temperature motor displacement limitation control is performed. If the driving hydraulic pressure is equal to or less than the predetermined threshold P0, the procedure continues to step S5.

In step S5, driving fluid temperature is obtained. Here, driving fluid temperature is obtained based on the detection signal from the fluid temperature detector 90.

Figure 10:
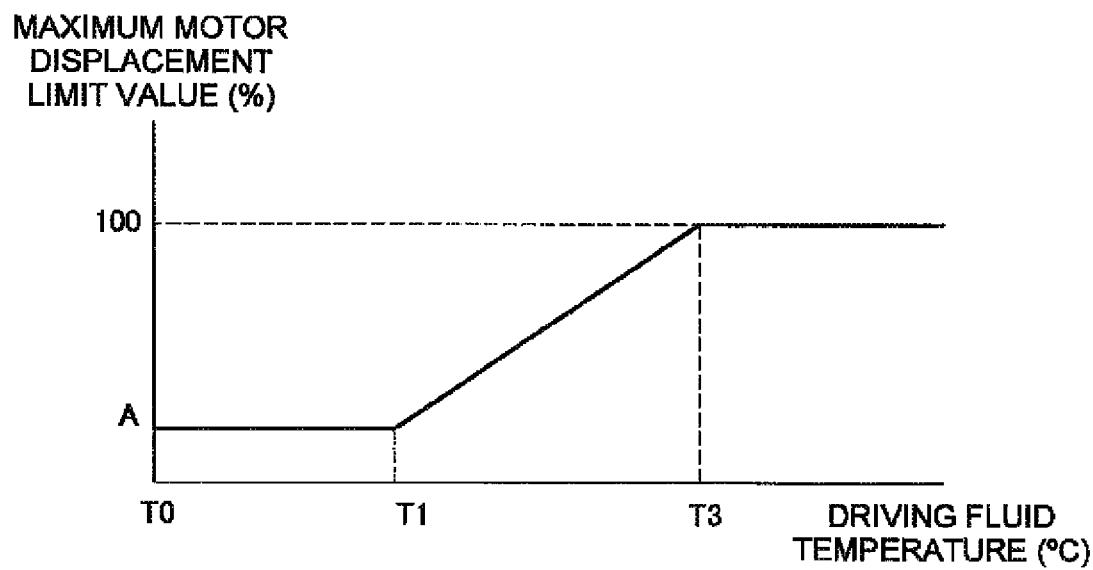
FIG. 10 is a map illustrating the relationship between driving fluid temperature and maximum motor displacement limit value during low temperature motor displacement limitation control.

Next, in step S6, a low-temperature maximum motor displacement limit value is calculated. Here, the low-temperature maximum motor displacement limit value is calculated based on a driving fluid temperature/maximum motor displacement limit value map such as that shown in FIG. 10 and the driving fluid temperature obtained in step S5. The maximum motor displacement limit value is the value by which the value before limiting is multiplied, and is expressed as a percentage in terms of a value of 100 or less. Here, when the driving fluid temperature is equal to or greater than temperature T3 on the driving fluid temperature/maximum motor displacement limit value map, the maximum motor displacement limit value is constant at 100%. That is to say, when the driving fluid temperature is temperature T3 or greater, maximum displacement is not reduced. When the driving fluid temperature is between temperatures T1 and T3, the maximum motor displacement limit value decreases in response to an increase in the degree to which the driving fluid temperature is reduced. Thus, when the driving fluid temperature is between temperatures T1 and T3, a greater decrease in the driving fluid temperature will correspond to a smaller value to which maximum displacement is reduced. When driving fluid temperature is between temperatures T0 and T1, the maximum motor displacement limit value is constant at a value A. Here, the maximum motor displacement limit value A is a value such that maximum displacement is a value equal to or less than the minimum displacement when the first speed is selected as the speed level during variable maximum speed control (see M1 in FIG. 6). Likewise, the maximum motor displacement limit value A is a value such that maximum displacement is a value greater than the minimum displacement when the second speed is selected as the speed level during variable maximum speed control (see M2 in FIG. 6). The driving fluid temperatures T0, T1, and T3 in FIG. 10 match driving fluid temperatures T0, T1, and T3 in FIG. 8.

In step S7, it is determined whether or not the low-temperature maximum motor displacement limit value calculated in step 6 is equal to or less than the maximum motor displacement limit value obtained from other control procedures. The maximum motor displacement limit value obtained from other control procedures referred to here is the maximum motor displacement limit value when the maximum displacement of the hydraulic motor 15 is reduced via traction control. When the low-temperature maximum motor displacement limit value is equal to or less than the maximum motor displacement limit value obtained from other control procedures, the procedure continues to step S8.

In step S8, the maximum displacement is set by the low-temperature maximum motor displacement limit value. Specifically, motor displacement is controlled with a maximum displacement value that is the value of the maximum displacement when low temperature motor displacement limitation control is not performed multiplied by the low-temperature maximum motor displacement limit value.

When the speed level in step S2 is the first speed, the procedure ends without proceeding to step S7. Specifically, reduction of the maximum displacement via low temperature motor displacement limitation control is not performed. In step S4 as well, when the driving hydraulic pressure is greater than the predetermined threshold P0, reduction of the maximum displacement via low temperature motor displacement limitation control is not performed.

If the low-temperature maximum motor displacement limit value is greater than the maximum motor displacement limit value obtained from other control procedures in step S7, the procedure continues to step S9.

In step S9, maximum displacement is set depending on the maximum motor displacement limit value obtained from other control procedures. Specifically, motor displacement is controlled based on the maximum displacement set during traction control. Thus, in steps S7 and S8, whichever is the smaller of the maximum displacement of the hydraulic motor 15 determined during traction control and the maximum displacement of the hydraulic motor 15 determined during low temperature motor displacement limitation control is set as the maximum displacement of the hydraulic motor 15.

Figure 11:
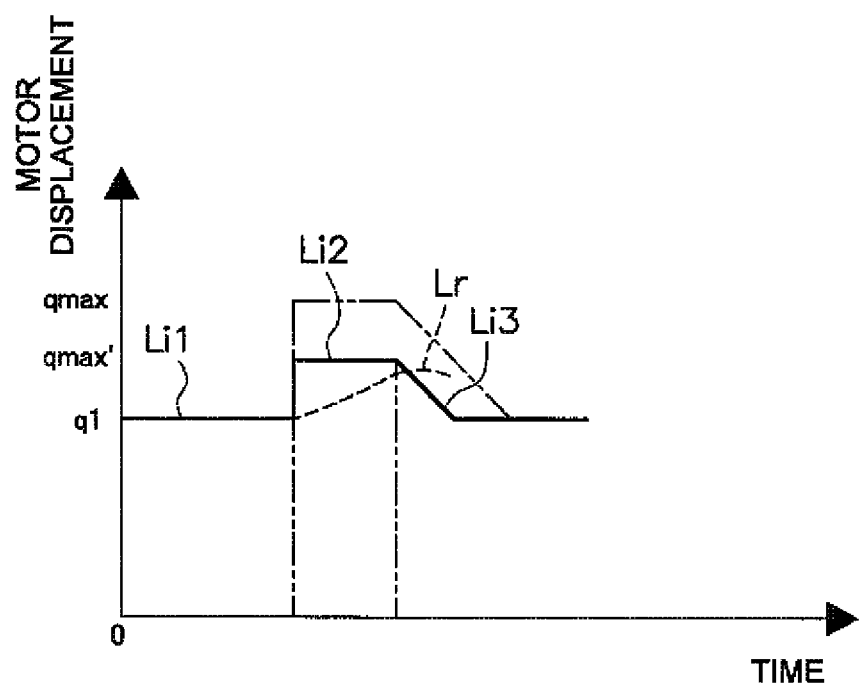
FIG. 11 is a graph illustrating command displacement and change in actual motor displacement in a work vehicle according to an embodiment of the present invention.
Figure 12:
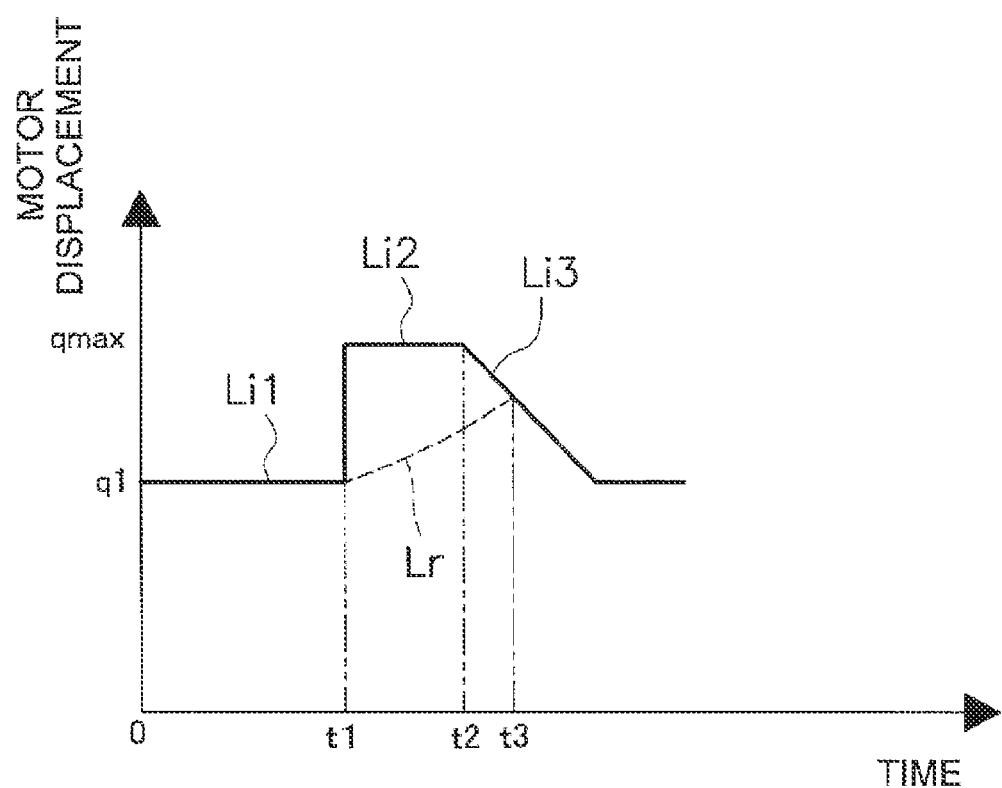
FIG. 12 is a graph illustrating command displacement and change in actual motor displacement in a conventional work vehicle.

In this work vehicle 1, if the driving fluid temperature is lower than a predetermined temperature, the maximum displacement of the hydraulic motor 15 is reduced. For example, as illustrated in FIG. 11, the maximum displacement of the hydraulic motor 15 is reduced from qmax to qmax'. For this reason, even if response delays occur in the hydraulic motor 15 due to the temperature of the hydraulic fluid being low, the response delay of the actual motor displacement (see dotted line Lr) in response to changes in command displacement (see solid lines Li1 through Li3) is diminished. Thus, the deviation between the target driving hydraulic pressure and the actual driving hydraulic pressure is diminished. It is thereby possible to prevent hunting from occurring during motor displacement control when hydraulic fluid temperature is low.

In this work vehicle 1, when the driving hydraulic pressure is greater than a predetermined threshold, reduction in maximum displacement of the hydraulic motor 15 via low temperature motor displacement limitation control is not performed even when the driving fluid temperature is low. Thus, when driving hydraulic pressure is increased due to work requiring large amounts of traction force being performed, it is possible to prevent reductions in traction force.

In this work vehicle 1, when low temperature motor displacement limitation control and traction control occur simultaneously, the smaller maximum displacement is set as the maximum displacement of the hydraulic motor 15. For this reason, when the temperature of the hydraulic fluid is low, hunting can be prevented without interference from traction control.

In this work vehicle 1, when the first speed is selected as the speed level during variable maximum speed control, reduction of the maximum displacement of the hydraulic motor 15 via low temperature motor displacement limitation control is not performed. For this reason, it is possible to prevent the maximum displacement from being set to a value that is less than the minimum displacement. When the first speed is selected as the speed level during variable maximum speed control, the minimum displacement of the hydraulic motor 15 is changed to the highest value (see M1 in FIG. 6). For this reason, even if the vehicle begins advancing from a parked state, the command displacement is not set to a value far reduced from the maximum displacement, and the incidence of hunting such as described above is reduced.

Other Embodiments (a) In the embodiment described above, the present invention is adopted for use in a wheel loader, but may also be adopted for use in other kinds of work vehicles.

(b) In the embodiment described above, PID control is performed, but other types of feedback control may also be performed.

(c) In the embodiment described above, it is determined whether the speed level is the first speed, but the method of determining the order of priority for low temperature motor displacement limitation control and variable maximum speed control is not limited to this. For example, if the minimum displacement of the hydraulic motor 15 set during variable maximum speed control is equal to or greater than the maximum displacement of the hydraulic motor 15 set during low temperature motor displacement limitation control, a configuration in which low temperature motor displacement limitation control is not performed may also be adopted.

(d) In the embodiment described above, a fluid temperature detector 90 for detecting the temperature of the hydraulic fluid being discharged from the hydraulic motor 15 is used as the fluid temperature detector, but the temperature of the hydraulic fluid may also be detected at other locations.

(e) In the embodiment described above, a dial-type member is used as the traction selecting member 89 and speed level selecting member 92, but another type of operating member such as a slide-type switch or lever may also be used. Also, the maximum traction levels selectable during traction control are not limited to those described above. Furthermore, the maximum traction can be continuously variable according to the amount to which the traction selecting member 89 is operated. Likewise, the number of speed levels in variable maximum speed control is not limited to that above. The maximum speed during variable maximum speed control may also be configured so as to be continuously variable according to the amount to which the speed level selecting member 92 is operated.

The present invention has the effect of preventing the occurrence of hunting during hydraulic motor displacement control when hydraulic fluid temperature is low, and is useful as a work vehicle.

The invention claimed is:

1. A work vehicle comprising:
an engine;
a hydraulic pump driven by the engine;
a hydraulic motor that is a variable displacement hydraulic motor driven by hydraulic fluid discharged by the hydraulic pump;
a motor displacement control part configured to control displacement of the hydraulic motor;
a drive wheel driven by the hydraulic motor;

a pressure detector configured to detect driving hydraulic pressure, which is the pressure of the hydraulic fluid for driving the hydraulic motor;

a fluid temperature detector configured to detect the temperature of the hydraulic fluid; and a controller configured to control the motor displacement control part via feedback control so that the driving hydraulic pressure detected by the pressure detector approaches a predetermined target driving hydraulic pressure, the controller being configured to perform low temperature motor displacement limitation control for reducing the maximum displacement of the hydraulic motor when the temperature of the hydraulic fluid detected by the fluid temperature detector is lower than a predetermined temperature.

2. The work vehicle according to claim 1, wherein the controller is configured not to perform the low temperature motor displacement limitation control when the driving hydraulic pressure detected by the pressure detector is greater than a predetermined threshold.

3. The work vehicle according to claim 1, wherein the controller is configured to perform traction control in which the controller changes the maximum displacement of the hydraulic motor for changing the traction force of the vehicle, and the controller is configured to control the motor displacement control part, with the smaller of the maximum displacement of the hydraulic motor determined during the traction control and the maximum displacement of the hydraulic motor determined during the low temperature motor displacement limitation control being set as the maximum displacement of the hydraulic motor.

4. The work vehicle according to claim 1, wherein the controller is configured to perform variable maximum speed control in which the controller changes the minimum displacement of the hydraulic motor for changing the maximum speed of the vehicle to a plurality of levels, and the controller is configured not to perform the low temperature motor displacement limitation control when the lowest maximum speed is selected during the variable maximum speed control.

5. The work vehicle according to claim 1, wherein the controller is configured to perform variable maximum speed control in which the controller changes the minimum displacement of the hydraulic motor for changing the maximum speed of the vehicle, and the controller is configured not to perform the low temperature motor displacement limitation control when the minimum displacement of the hydraulic motor determined by the variable maximum speed control is equal to or greater than the maximum displacement of the hydraulic motor determined by the low temperature motor displacement limitation control.

* * * * *